(12) United States Patent
Ghosh et al.

(10) Patent No.: US 10,637,369 B2
(45) Date of Patent: Apr. 28, 2020

(54) CURRENT SENSING SYSTEM FOR FULL-BRIDGE PULSE-WIDTH MODULATED INVERTER SYSTEM

(71) Applicant: SCHNEIDER ELECTRIC IT CORPORATION, West Kingston, RI (US)

(72) Inventors: Rajesh Ghosh, Bangalore (IN); Mahendrakumar H. Lipare, Bangalore (IN); Damir Klikic, Waltham, MA (US); Miao-Xin Wang, Montbonnot Saint Martin (FR); Mudiyula Srikanth, Bangalore (IN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 15/297,248

(22) Filed: Oct. 19, 2016

(65) Prior Publication Data
US 2017/0110987 A1    Apr. 20, 2017

(30) Foreign Application Priority Data

Oct. 20, 2015 (IN) .......................... 3379/DEL/2015

(51) Int. Cl.
*H02M 7/5387* (2007.01)
*H02M 1/08* (2006.01)
(Continued)

(52) U.S. Cl.
CPC ........... *H02M 7/5387* (2013.01); *H02M 1/08* (2013.01); *H02M 1/12* (2013.01); *H02M 2001/0009* (2013.01)

(58) Field of Classification Search
CPC .......... H02M 7/42; H02M 7/48; H02M 7/487; H02M 7/493; H02M 7/501; H02M 7/4826;
(Continued)

(56) References Cited

U.S. PATENT DOCUMENTS

| 4,333,046 A | 6/1982 | Lee |
| 5,309,349 A | 5/1994 | Kwan |

(Continued)

FOREIGN PATENT DOCUMENTS

| CN | 1389737 A | 1/2003 |
| CN | 101246187 A | 8/2008 |

(Continued)

OTHER PUBLICATIONS

Extended European Search Report from corresponding European Application No. 16194621.5 dated May 17, 2017.
(Continued)

*Primary Examiner* — Bryan R Perez
(74) *Attorney, Agent, or Firm* — Lando & Anastasi, LLP

(57) ABSTRACT

According to one aspect, embodiments of the invention provide an inverter system including an input having a positive DC node and a negative DC node coupled to a DC power source to receive input DC power, an output coupled to a load to provide output AC power, a first inverter leg including a first and a second switching device, a second inverter leg including a third and a fourth switching device, the first inverter leg and the second inverter leg being adapted to convert the input DC power to the output AC power, a current sensor coupled to one of the negative and the positive DC node, and a controller assembly adapted to measure a current through the current sensor and determine an inductor current through an inductor coupled to the
(Continued)

output, an input current, and an output current based at least on the current through the current sensor.

14 Claims, 11 Drawing Sheets

(51) Int. Cl.
*H02M 1/12* (2006.01)
*H02M 1/00* (2006.01)

(58) Field of Classification Search
CPC ............... H02M 7/49; H02M 7/4807; H02M 2007/4803; H02M 2007/4822
USPC .............................. 363/37, 97, 98, 131, 132
See application file for complete search history.

(56) References Cited

U.S. PATENT DOCUMENTS

| | | | |
|---|---|---|---|
| 5,555,165 | A | 9/1996 | Vinciarelli |
| 5,670,864 | A | 9/1997 | Marx et al. |
| 6,069,801 | A | 5/2000 | Hodge, Jr. et al. |
| 6,208,537 | B1 | 3/2001 | Skibinski et al. |
| 6,642,690 | B2 | 11/2003 | Kim |
| 7,432,616 | B2 | 10/2008 | Hatai et al. |
| 8,854,026 | B2 | 10/2014 | Karlsson et al. |
| 8,963,535 | B1 | 2/2015 | Melanson |
| 2004/0095266 | A1 | 5/2004 | Kernahan et al. |
| 2005/0219880 | A1 | 10/2005 | Nagai et al. |
| 2007/0297200 | A1* | 12/2007 | Ranstad ............... H02M 5/4585 363/21.02 |
| 2008/0112202 | A1 | 5/2008 | Hu et al. |
| 2009/0002343 | A1 | 1/2009 | Land et al. |
| 2009/0122580 | A1 | 5/2009 | Stamm et al. |
| 2011/0007537 | A1* | 1/2011 | Fornage ............... H02M 1/08 363/132 |
| 2011/0278934 | A1* | 11/2011 | Ghosh ............... H02J 9/062 307/66 |
| 2012/0112772 | A1 | 5/2012 | Huang |
| 2012/0163046 | A1* | 6/2012 | Hibino ............... H02P 27/08 363/37 |
| 2013/0193945 | A1 | 8/2013 | Adest et al. |
| 2014/0002044 | A1 | 1/2014 | Babazadeh et al. |
| 2014/0265897 | A1 | 9/2014 | Taipale et al. |
| 2015/0036397 | A1* | 2/2015 | Wang ............... H02M 1/32 363/55 |
| 2015/0180279 | A1 | 6/2015 | Nielsen |
| 2016/0268890 | A1* | 9/2016 | Ayai ............... H02M 3/156 |
| 2016/0299177 | A1 | 10/2016 | De Cesaris |
| 2016/0329829 | A1 | 11/2016 | Ayai et al. |
| 2017/0093303 | A1* | 3/2017 | Hayashi ............... H02M 1/088 |

FOREIGN PATENT DOCUMENTS

| | | |
|---|---|---|
| CN | 102095918 A | 6/2011 |
| CN | 102291033 A | 12/2011 |
| CN | 102804577 A | 11/2012 |
| EP | 0576271 A2 | 12/1993 |
| EP | 1280264 A2 | 1/2003 |
| EP | 1406373 A2 | 4/2004 |
| EP | 1959551 A1 | 8/2008 |
| EP | 2390997 A2 | 11/2011 |
| WO | 2004047263 A2 | 6/2004 |
| WO | 20120124223 A1 | 9/2012 |
| WO | 2015084337 A1 | 6/2015 |
| WO | 20150105081 A1 | 7/2015 |

OTHER PUBLICATIONS

Caceres et al. A Boost DC-AC Converter: Analysis, Design, and Experimentation. IEEE Transactions on Power Electronics, vol. 14, No. 1, Jan. 1999. [retrieved on Mar. 25, 2014] Retrieved from the Internet <URL:http://www.bbs.dianyuan.com/bbs/u/31/1122209973.pdf>.

Kükrer, O: "Deadbeat Control of a Three-Phase Inverter with an Output LC Filter," IEEE Transactions on Power Electronics, Institute of Electrical and Electronics Engineers, USA, vol. 11, No. 1, Jan. 31, 1996 (Jan. 31, 1996), pp. 16-23.

Spiazzi G et al: "Single phase line frequency commutated voltage source inverter suitable for fuel cell interfacing", Power Electronics Specialists Conference; [Annual Power Electronics Specialists Conference], vol. 2, Jun. 23, 2002 (Jun. 23, 2002), pp. 734-739, XP010747421, ISBN: 978-0-7803-7262-7.

* cited by examiner

CURRENT SENSING SYSTEM FOR FULL-BRIDGE PULSE-WIDTH MODULATED INVERTER SYSTEM

CROSS-REFERENCE TO RELATED APPLICATION

This application claims the benefit under 35 U.S.C. § 119 of India Patent Application No. 3379/DEL/2015, filed Oct. 20, 2015, titled CURRENT SENSING SYSTEM FOR FULL-BRIDGE PULSE-WIDTH MODULATED INVERTER SYSTEM, which is hereby incorporated herein by reference in its entirety.

BACKGROUND OF INVENTION

1. Field of Invention

The present disclosure relates generally to power systems, and in particular to power conversion devices.

2. Discussion of Related Art

Single-Phase Full-Bridge (FB) Pulse Width Modulated (PWM) power converters are widely used in many solar systems and uninterruptible power supply (UPS) systems. There is an ever-increasing demand to increase the efficiency and reduce the size and complexity of such converters. Accordingly, various approaches using low-loss wide-bandgap devices, high frequency processes, advanced cooling systems, and advanced magnetic components have been proposed posed to reduce the size of known power converters, and in particular, FB PWM inverters.

SUMMARY OF INVENTION

Various aspects and embodiments provide an improved current sensing system and inverter system that effectively increase the power density of conventional systems, while reducing cost, and eliminating the need for multiple isolated current sensors. Accordingly, various aspects and embodiments also simplify the hardware circuit complexity and printed circuit board (PCB) layout of conventional systems. At least one aspect includes an inverter system including a current sensor coupled in one of a negative DC node and positive DC node of an input of the inverter system. In an embodiment, a controller assembly coupled to the single current sensor is adapted to determine at least an inductor current, an input current, and an output current based on a current through the current sensor. Further aspects and embodiments include an overcurrent protection system based at least in part on a value of the current through the current sensor.

One aspect includes an inverter system. In one embodiment the inverter system includes an input having a positive DC node and a negative DC node adapted to be coupled to a DC power source and to receive input DC power from the DC power source, an output adapted to be coupled to at least one load and to provide output AC power to the at least one load, a first inverter leg including a first switching device and a second switching device, a second inverter leg including a third switching device and a fourth switching device, the first inverter leg and the second inverter leg being coupled between the input and the output and adapted to convert the input DC power to the output AC power, a current sensor coupled to one of the negative DC node and the positive DC node, and a controller assembly adapted to measure a current through the current sensor and determine an inductor current through an inductor coupled to the output, an input current, and an output current based at least in part on the current through the current sensor.

According to one embodiment, the current sensor is a non-inductive current sense resistor. In one embodiment the inverter system includes a first capacitor coupled between the negative DC node and the positive DC node, and a second capacitor coupled between the negative DC node and the positive DC node, wherein the non-inductive current sense resistor is coupled between the first capacitor and the second capacitor. In a further embodiment, the inverter system includes a first voltage sensor positioned to measure an input voltage, and a second voltage sensor positioned to measure an output voltage, wherein the controller assembly is adapted to determine a value the input current based on the current through the current sensor and the input voltage, adapted to determine a value for the output current based on the inductor current and the output voltage, and adapted to control the first inverter leg and the second inverter leg based on the value for the input current and the value for the output current.

In one embodiment, the controller assembly is adapted to estimate a voltage across the first capacitor based at least in part on a model of the first capacitor, compare the estimated voltage across the first capacitor and the input voltage to determine a current through the first capacitor, and compare the current through the first capacitor and the current through the current sensor to determine the input current. According to an embodiment, inverter system includes an output capacitor coupled across the output, wherein the controller assembly is adapted to estimate a voltage across the output capacitor based at least in part on a model of the output filter capacitor, compare the estimated voltage across the output capacitor and the output voltage to determine a current through the output capacitor, and compare the current through the output capacitor and the inductor current to determine the output current.

According to an embodiment, the controller assembly is adapted to control the first inverter leg and the second inverter leg based on a switching signal having a triangular waveform, and sample the current through the current sensor at a valley of the switching signal during a positive cycle of an output voltage to determine the inductor current. In a further embodiment, the controller assembly is adapted to sample the current through the current sensor at a peak of the switching signal during a negative cycle of the output voltage to determine the inductor current. In one embodiment, the inverter system further includes an overcurrent protection system adapted to determine the occurrence of an overcurrent condition and control a position of the third switching device and fourth switching device of the second inverter leg during the overcurrent condition.

Another aspect includes a method for operating an inverter system including an input having a positive DC node and a negative DC node, an output coupled to at least one load, a first inverter leg and a second inverter leg coupled between the input and the output, an inductor coupled to the output, and a current sensor coupled to one of the negative DC node and the positive DC node. The method includes receiving DC power from a DC power source at the input, measuring a current through the current sensor coupled to one of the negative DC node and positive DC node, and determining an inductor current at the inductor, an input current, and an output current based at least in part on the current through the current sensor.

According to an embodiment, the current sensor is a non-inductive current sense resistor, and measuring the current through the current sensor includes measuring a voltage drop across the non-inductive current sense resistor. In one embodiment, determining the inductor current includes sampling the current through the current sensor at a valley of a switching signal during a positive cycle of an output voltage, wherein the first inverter leg and second inverter leg are controlled based on a switching signal having a triangular waveform. In a further embodiment, determining the inductor current includes sampling the current through the current sensor at a peak of the switching signal during a negative cycle of the output voltage.

In one embodiment, the inverter system includes a first capacitor coupled between the negative DC node and the positive DC node, and determining the input current includes measuring an input voltage, determining a voltage across the first capacitor based at least in part on a model of the first capacitor, comparing the estimated voltage across the first capacitor and the input voltage to determine a current through the first capacitor, and comparing the current through the first capacitor and the DC node current to determine a value for the input current.

In an embodiment, the inverter system includes an output capacitor coupled across the output, and determining the output current includes measuring an output voltage, determining a voltage across the output capacitor based at least in part on a model of the output capacitor, comparing the estimated voltage across the output capacitor and the output voltage to determine a current through the output capacitor, and comparing the current through the output capacitor and the inductor current to determine a value for the output current. In one embodiment, the method includes comparing the current through the current sensor to a reference current to detect the occurrence of an overcurrent condition, and controlling a position of a first switching device of the second inverter leg and a second switching device of the second inverter leg during the overcurrent condition.

Another aspect includes an inverter system including an input having a positive DC node and a negative DC node adapted to be coupled to a DC power source and to receive input DC power from the DC power source, an output adapted to be coupled to at least one load and to provide output AC power to the load, a first inverter leg including a first switching device and a second switching device, a second inverter leg including a third switching device and a fourth switching device, the first inverter leg and the second inverter leg being coupled between the input and the output and adapted to convert the input DC power to the output AC power, and sensing means coupled to one of the negative DC node and the positive DC node for measuring a current through the sensing means and determining an inductor current at an inductor coupled to the output, an input current, and an output current based at least in part on the current through the sensing means.

In one embodiment, the inverter system includes a first voltage sensor positioned to measure a input voltage, and a second voltage sensor positioned to measure an output voltage, wherein the sensing means are adapted to determine a value for the input current based at least in part on the current through the sensing means and the input voltage, and determine a value for the output current based at least in part on the inductor current and the output voltage. According to an embodiment, the sensing means are adapted to sample the current through the sensing means at a valley of a switching signal during a positive cycle of an output voltage to determine the inductor current, wherein the first inverter leg and second inverter leg are controlled based on a switching signal having a triangular waveform, and sample the current through the sensing means at a peak of the switching signal during a negative cycle of the output voltage to determine the inductor current.

According to an embodiment the inverter system includes an overcurrent protection system adapted to determine the occurrence of an overcurrent condition and control a position of the third switching device and fourth switching device of the second inverter leg during the overcurrent condition.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Figure 1:
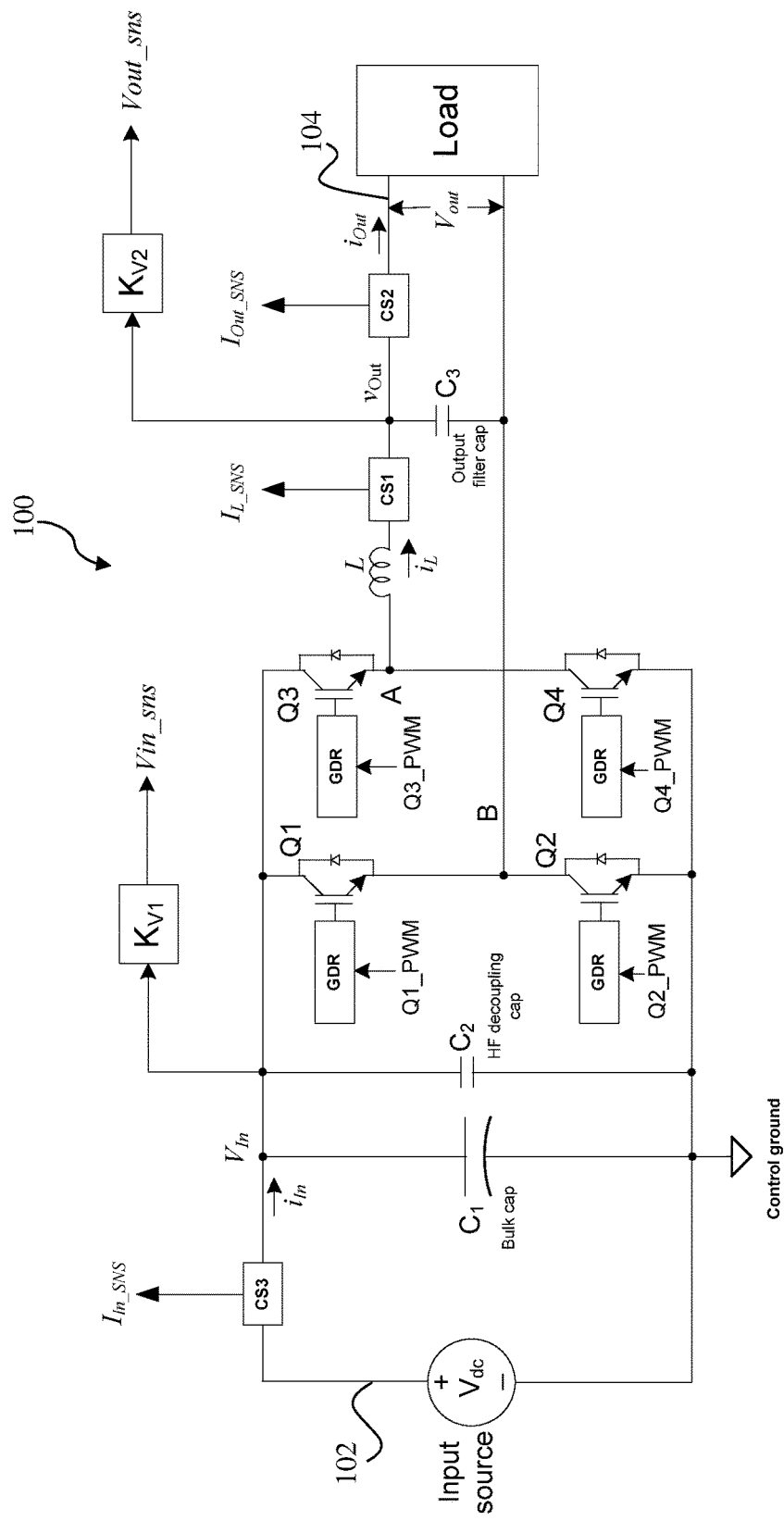
FIG. 1 is a schematic diagram of a conventional single-phase full-bridge pulse width modulated inverter system.

FIG. 1 is an example schematic of a conventional high-efficiency single-phase FB PWM inverter system. The conventional inverter system 100 includes a first converter leg (devices $Q_1$ and $Q_2$) which is conduction loss optimized and operated at a fundamental frequency of the output voltage of the inverter system 100. A second converter leg (devices $Q_3$ and $Q_4$), is operated at a high frequency. The converter legs of the inverter system 100 are controlled based on a comparison of a control signal and a switching signal. The control signal establishes the fundamental frequency of the inverter system 100, and the switching signal establishes the switching frequency of the converter legs. The devices ($Q_1$, $Q_2$, $Q_3$, and $Q_4$) in each converter leg are never both on or off at a given moment in time; therefore, the voltage of each line fluctuates between the input voltage and zero. By operating the inverter system 100 in this manner, an input DC voltage is changed to an output AC voltage, with a fundamental frequency corresponding to the control signal.

As shown in FIG. 1, in the conventional inverter system 100 two voltage sensors ($S_{V1}$ and $S_{V2}$) and three current sensors (CS1, CS2, and CS3) are needed for control, protection, and measurement purposes. In particular, the two voltage sensors are used to measure a voltage ($V_{In}$) at an input 102 of the inverter, and a voltage ($V_{Out}$) at an output 104 of the inverter system. While the voltage sensors of conventional systems may not consume a large amount of space, the current sensors used in conventional inverter systems often dramatically increase the size of the inverter. For instance, conventional inverter systems typically include large isolated hall-effect sensors, which define a measured current with respect to a control ground. Accordingly, in addition to limiting the power density of the inverter system, the additional printed circuit board (PCB) traces necessary to deliver the measured signals from the hall-effect sensors to a controller of the inverter system increases the complexity of the inverter system.

As discussed above, conventional single-phase full-bridge (FB) pulse width modulated (PWM) inverter systems suffer from a large footprint and limited power density. Understandably, this limits the use of conventional FB PWM inverters in many situations. In particular, the use of spatially large current sensors (e.g., Hall-effect sensors) to control, monitor, and protect the inverter system, significantly impacts the size of the inverter system. Conventional isolated current sensors also require additional printed circuit board (PCB) traces to measure a given current with respect to ground, and to deliver the measured signal to a controller, which undesirably increases the complexity and cost of manufacturing the inverter system. Accordingly, various aspects and embodiments discussed herein include an improved inverter system and current sensing system that effectively increases power density, reduces cost, and reduces complexity, when compared to conventional FB PWM inverter systems.

Figure 2A:
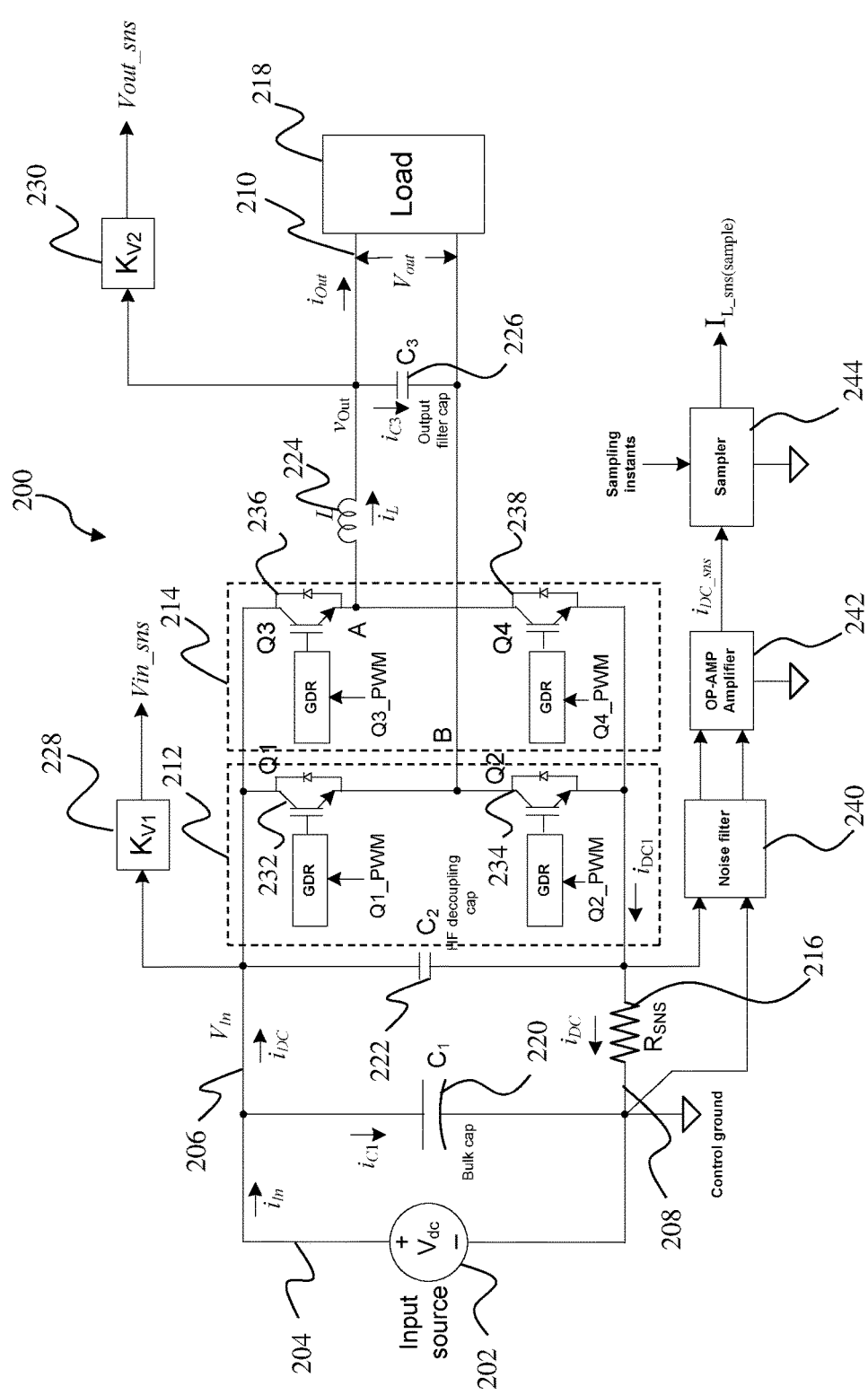
FIG. 2A is a schematic diagram of an example inverter system according to aspects of the current invention.
Figure 2B:
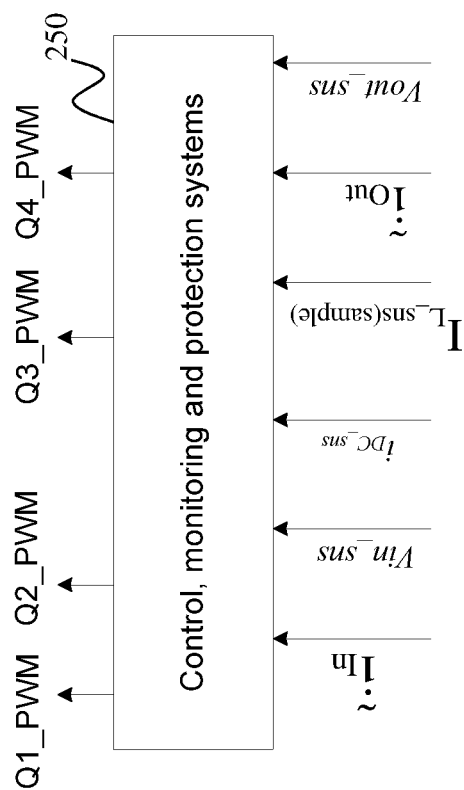
FIG. 2B is a block diagram of an example controller assembly of the inverter system shown in FIG. 2A, according to aspects of the current invention.

FIG. 2A is a schematic diagram of an inverter system according to aspects of the current invention. As shown, the inverter system 200 may include a DC source 202, an input 204 including a positive DC node 206 and a negative DC node 208, an output 210, a plurality of inverter legs (e.g., a first inverter leg 212 and a second inverter leg 214), a current sensor 216, and a controller assembly. A block diagram of one example of the controller assembly is shown in FIG. 2B. As FIG. 2A shows, the input 204 is coupled to the DC power source 202 to receive input DC power from the power source 202. Similarly, the output 210 may be coupled to at least one load 218 and provide output AC power to the at least one load 218. In further embodiments, the system 200 may include a bulk capacitor 220, a high-frequency decoupling capacitor 222, an inductor 224, an output filter capacitor 226, an overcurrent protection system, and a plurality of voltage sensors (e.g., a first voltage sensor 228 and a second voltage sensor 230).

In various embodiments, the first inverter leg 212 and the second inverter leg 214 are coupled between the input 204 and the output 210 of the inverter system 200. Each inverter leg may include a first switching device and a second switching device. In particular, the first inverter leg 212 is shown including a first switching device (Q1) 232 and a second switching device (Q2) 234, and the second inverter leg 214 is shown including a third switching device (Q3) 236 and a fourth switching device (Q4) 238. In various embodiments, each switching device may include a transistor and a diode, as is understood in the art. Each switching device may be controlled using a switching signal having a triangular waveform to generate switching device control signals (e.g., Q1_PWM, Q2_PWM, Q3_PWM, and Q4_PWM) provided by the controller assembly. Each switching device control signal controls the state (i.e., position) of the receiving device, that is, whether the switching device is activated or deactivated. Control of the inverter legs generates the AC output power at the output of the inverting system 200. Each transistor of a switching device may be coupled to a gate driver power amplifier (GDR) that accepts a lower power input (e.g., the switching device control signal) and produces a high-current drive input for a gate of the transistor.

In various embodiments, the first inverter leg 212 may be conduction loss optimized and operated at a fundamental frequency of an output voltage of the inverter system 200. For example, the fundamental frequency of the output voltage of one embodiment may include 50 Hz or 60 Hz. In further embodiments, the second inverter leg 214 is operated at a high frequency. As FIG. 2A also shows, the inverter system 200 may include a plurality of capacitors coupled between the negative DC node and the positive DC node of the inverter system input, such as the bulk capacitor 220 and the high-frequency capacitor 222. Each capacitor may be adapted to filter harmonic currents in the positive DC node 206 and negative DC node 208. For instance, a capacitance value of the bulk capacitor 220 may be chosen to filter a second-order harmonic current. Similarly, one or more capacitors, such as the output filter capacitor 226, coupled across the output 210 of the inverter system 218 may be adapted to remove undesirable effects at the inverter system output.

In contrast to conventional schemes (e.g., the inverter system 100 shown in FIG. 1) which require at least three separate current sensors to measure a current at the inductor, an input current, and an output current, various aspects and embodiments include a single current sensor. As shown in FIG. 2A, the current sensor 216 of various embodiments may be positioned at negative DC node 208 of the inverter system, and interposed between the bulk capacitor 220 and the high-frequency capacitor 222. In various other embodiments, the current sensor 216 may be positioned within the positive DC node 206 of the inverter system 200 between the bulk capacitor 220 and the high-frequency capacitor 222. For example, the current sensor 216 of various embodiments may include a non-inductive current sense resistor.

The current sensor 216 is positioned to measure a current through the current sensor 216 at the DC node (referred to herein as a DC node current) from which the controller assembly may determine the inductor current, the output current, and the input current. In addition to an input voltage measured by the first voltage sensor 228, and an output voltage measured by the second voltage sensor 230, the inductor current, output current, and input current may be used to perform one or more operations such as, controlling the inverter system 200, monitoring a quality of the input voltage, monitoring and controlling the output power, monitoring and controlling the input power, determining internal losses of the inverter system 200, monitoring a health of the inverter system 200, providing short circuit protection, and providing fault diagnostics. In particular, measured voltages and determined currents may be used as described in Table 1 below.

device 234, third switching device 236, and fourth switching device 238 (i.e., signals Q1_PWM, Q2_PWM, Q3_PWM, and Q4_PWM). While shown in FIG. 2B as receiving the inductor current, input current, and output current, it is appreciated that in various embodiments the controller assembly 250 is adapted to generate values for the input current, the output current, and the inductor current based on the DC node current and measured voltages.

Returning to FIG. 2A, the first voltage sensor 228 may be positioned at the input 204 of the inverter system 200, and the second voltage sensor 230 may be positioned at the output 210 of the inverter system. In various embodiments, the first voltage sensor 228 and the second voltage sensor 230 include resistive potential divider circuits. At least one operational amplifier based differential amplifier may be used to define the sensed voltages with respect to a control ground. Accordingly, in various embodiments, the plurality of voltage sensors do not consume a large volume of space and have minimal impact on the power density of the inverter system 200.

In various embodiments, the inverter system 200 includes a noise filter 240, an amplifier 242, and a sampling module 244 coupled to the current sensor. The sampling module 244 of various embodiments may be executed by the controller assembly to sample the DC node current as discussed below.

The voltage drop across the non-inductive current sense resistor is filtered through the noise filter 240 and amplified by the filter 242 as the DC node current, $i_{DC\_sns}$, before being sent to the controller assembly. In various embodi-

TABLE 1

| | Inverter closed loop control | Input voltage quality monitoring | Output power monitoring and control (VA, W, PF) | Input power monitoring and control (W) | Inverter internal loss calculation | Inverter health monitoring | Output short circuit protection | Inverter internal fault diagnostic |
|---|---|---|---|---|---|---|---|---|
| Vin_sns | ✓ | ✓ | | ✓ | ✓ | | | ✓ |
| Vout_sns | ✓ | | ✓ | | ✓ | ✓ | ✓ | ✓ |
| Iin_sns | | | | ✓ | ✓ | ✓ | ✓ | ✓ |
| IL_sns | ✓ | | | | ✓ | ✓ | ✓ | |
| Iout_sns | ✓ | | ✓ | | ✓ | ✓ | ✓ | |

FIG. 2B is a block diagram of an example controller assembly 250 of the inverter system 200 shown in FIG. 2A, according to various aspects and embodiments. The controller assembly 250 may include a single controller adapted to perform the processes discussed herein; however, in various other embodiments the controller assembly 250 may consist of a plurality of subsystems which may include a controller, signal processing circuitry, or other control circuitry. In particular, the controller assembly 250 may include both analog processing circuitry (e.g., a microcontroller) and digital signal processing circuitry (e.g., a digital signal processor (DSP)). For instance, the microcontroller of various embodiments may include a processor core, memory, and programmable input/output components. The microcontroller may be configured to automatically control various components of the inverter system 200, such as the first inverter leg 212 and the second inverter leg 214.

In various embodiments, the controller assembly 250 receives an input voltage ($V_{in\_sns}$) sensed by the first voltage sensor 228, an output voltage ($V_{out\_sns}$) sensed by the second voltage sensor 230, the DC node current ($i_{DC\_sns}$) a sampled inductor current ($I_{L\_sns(sample)}$), a the input current ($i_{In}$), and the output current ($i_{Out}$). In such an embodiment, the controller assembly 250 may be adapted to generate and communicate a series of switching device control signals to control the first switching device 232, second switching ments the amplifier 242 includes an operational-amplifier amplifier. The DC node current received at the controller assembly is sampled by the controller assembly to determine the inductor current $I_{L\_sns(sample)}$ through the inductor 224. In various embodiments, the controller assembly is adapted to sample the DC node current through an analog-to-digital converter (ADC) of the controller assembly. In various embodiments, the DC bus current, $i_{DC1}$, is substantially the same as the actual inductor current, $i_L$, when the diagonal switching devices (e.g., the second switching device 234 are the third switching device 236) are activated.

Similarly, in various embodiments the DC bus current, $i_{DC1}$, is substantially a negative of the actual inductor current, $-i_L$, whenever the devices the first switching device 232 and the fourth switching device 238 are activated. When the first switching device 232 and the third switching device 236, or, the second switching device 234 and the fourth switching device 238 are activated, the DC bus current is substantially zero. In various embodiments, the high-frequency capacitor ($C_2$) 232 may be a low-valued capacitor. Accordingly, the high-frequency capacitor 232 of various embodiments bypasses very high-frequency current, which prevents high voltage spikes across the switching devices of various embodiments. In both situations, the DC node current through the current sense resistor of various embodiments is substantially equal to the DC bus current.

Figure 3:
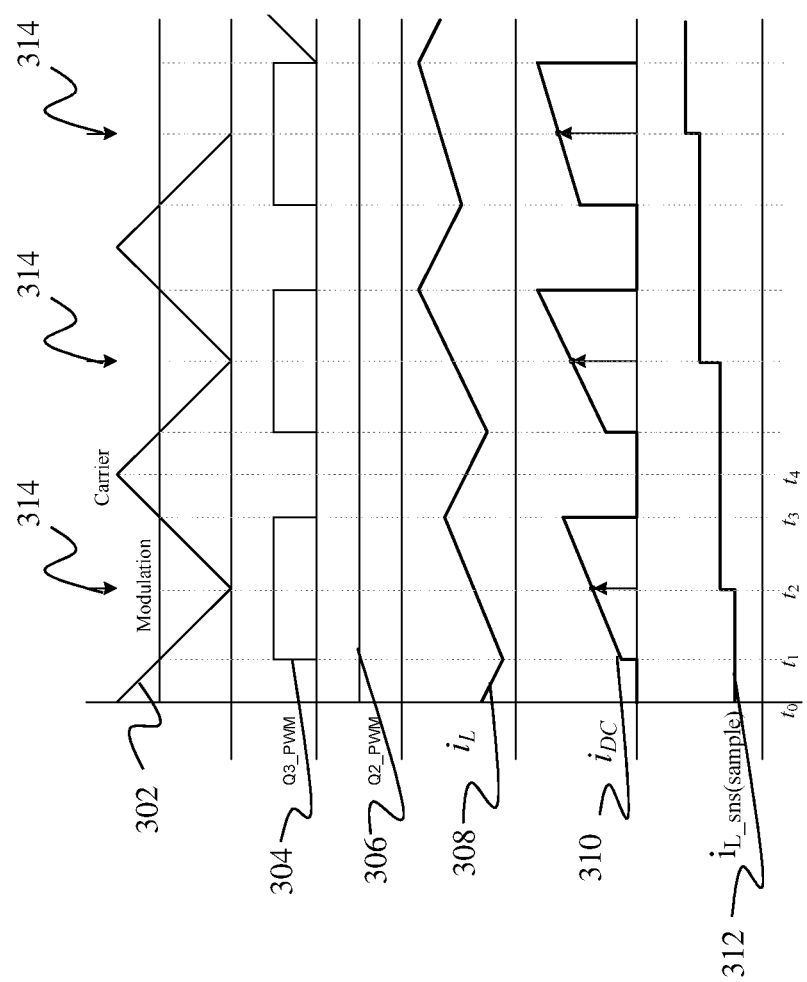
FIG. 3 is an illustration of example waveforms corresponding to a positive output voltage cycle of the inverter system shown in FIG. 2A, according to aspects of the current invention.

In various embodiments, the controller assembly determines the inductor current by directly sampling the DC node current through the ADC of the controller assembly. One example is shown with reference to FIG. 3. FIG. 3 is an illustration of example waveforms corresponding to a positive output voltage cycle of the inverter system 200 shown in FIG. 2A. A first waveform 302 represents the switching signal having a triangle waveform, a second waveform 304 represents the switching device control signal of the third switching device 236 responsive to control based on the first waveform 302, a third waveform 306 represents the switching device control signal of the second switching device 234 responsive to control based on the first waveform 302, a fourth waveform 308 represents the actual inductor current (e.g., analog component), a fifth waveform 310 represents the DC node current, and a sixth waveform 312 represents the sampled inductor current (e.g., digital sample).

As FIG. 3 shows, in various embodiments during a positive cycle of the output voltage of the inverter system 200 the second switching device 234 of the first inverter leg 212 is in a permanently activated state. The switching devices of the second inverter leg 214 (i.e., the high frequency inverter leg) are operated at a high frequency generated using the switching signal triangle waveform shown.

During periods in which the third switching device 236 is activated, the DC node current is substantially equal to the actual inductor current. In various embodiments the controller assembly (e.g., ADC) is configured to sample the DC node current at the valley of the switching signal to determine the inductor current (i.e., the sampled inductor current). Sampling the DC node current at the valley of the switching signal, as indicated by arrows 314 in FIG. 3, samples an average of the inductor current. Accordingly, in various embodiments the inductor current, and in particular a sampled induct current, is directly obtained by sampling the DC node current signal through the ADC of the controller assembly. In addition to reducing the complexity of the inverter system 200 when compared to conventional systems, such embodiments significantly increase the power density and lower the overall footprint of the inverter system 200 by avoiding the use of Hall-effect sensors to determine the inductor current.

Figure 4:
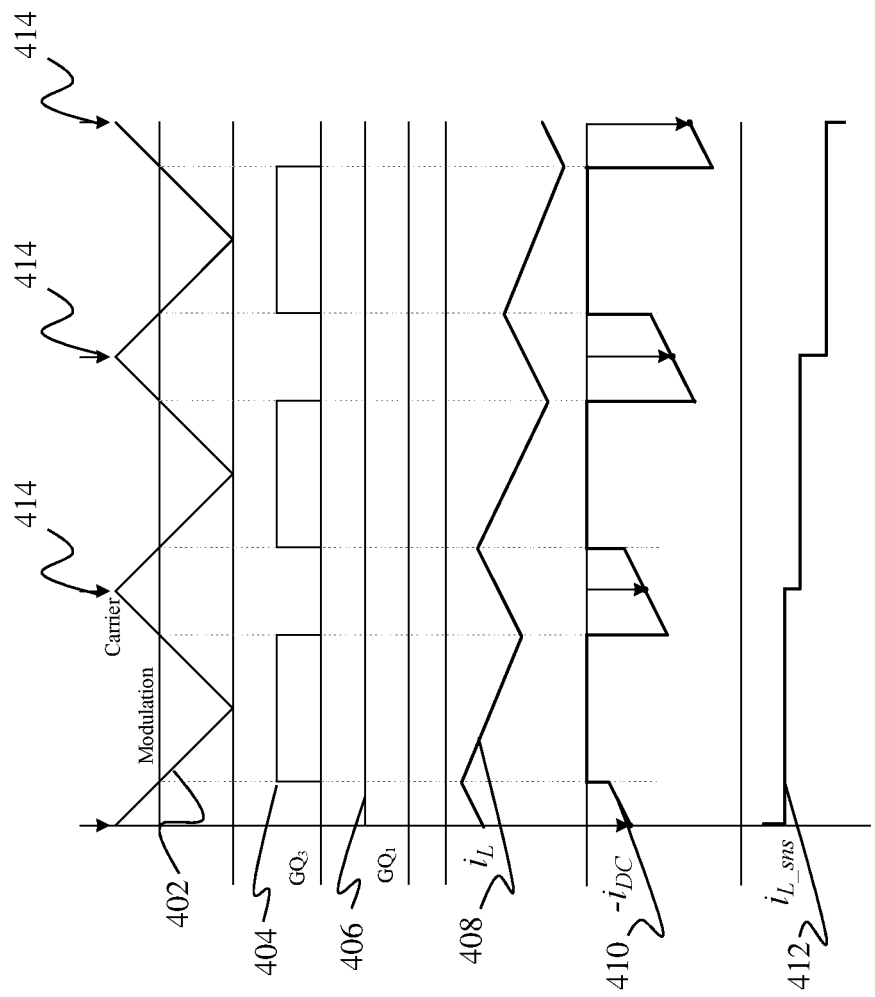
FIG. 4 is an illustration of example waveforms corresponding to a negative output voltage cycle of the inverter system shown in FIG. 2A, according to aspects of the current invention.

FIG. 4 is an illustration of example waveforms corresponding to a negative output voltage cycle of the inverter system shown in FIG. 2A. A first waveform 402 represents the switching signal having a triangular waveform, a second waveform 404 represents the switching device control signal of the third switching device 236 responsive to control based on the first waveform 402, a third waveform 406 represents the switching device control signal of the first switching device 232 responsive to control based on the first waveform 402, a fourth waveform 408 represents the actual inductor current (e.g., analog component), a fifth waveform 410 represents the negative DC node current, and a sixth waveform 412 represents the sampled inductor current (e.g., digital sample).

As FIG. 4 shows, in various embodiments during a negative cycle of the output voltage of the inverter system 200 the first switching device 232 of the first inverter leg 212 is maintained by the controller assembly in a permanently active state. The third switching device 236 of the second inverter leg 214 (i.e., the high frequency inverter leg) is operated at a high frequency using a switching device control signal generated using the switching signal having the triangular waveform.

During periods in which the third switching device 236 is activated, the negative DC node current is substantially equal to the actual negative inductor current. In various embodiments, the controller assembly (e.g., ADC) is configured to sample the DC node current at the peaks of the switching signal to determine the inductor current (e.g., the sampled inductor current). Sampling the DC node current at the peaks of the switching signal, as indicated by arrows 414 in FIG. 4, samples the average negative inductor current. Sampling during the valleys of the switching signal, as performed during a positive cycle of the output voltage of one embodiment would return an undesirable value of 0 as both the first switching device 232 and the third switching device 236 would be activated. In various embodiments, the controller assembly includes an inverter adapted to invert the polarity of the determined inductor current. Accordingly, in at least one embodiment the controller assembly samples the DC node current at a valley of the switching signal during a positive cycle of the output voltage, and at a peak of the switching single during a negative cycle of the output voltage to determine the inductor current.

In various embodiments, the controller assembly includes one or more modules adapted to determine the input current and the output current, and in particular a value of the input current and a value for the output current, based at least in part on the DC node current. For example, the controller assembly may include an input current module and an output current module.

Figure 5:
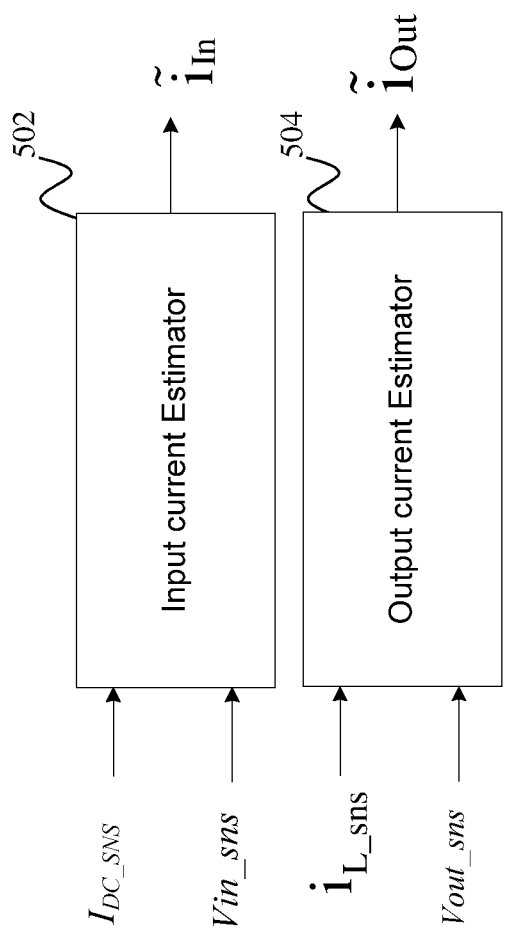
FIG. 5 is a block diagram of an example input current module and output current module of the controller assembly shown in FIG. 2B, according to aspects of the current invention.

FIG. 5 is a block diagram of example modules of the controller assembly of one embodiment. In various embodiments, the input current module 502 receives as an input the DC node current and the input voltage. As discussed above with reference to FIG. 2A, in various embodiments the input voltage may be measured by one or more voltage sensors, such as voltage sensor 228 positioned at the input 204 of the inverter system 200. In various embodiments, the output current module 504 receives as an input the sampled inductor current and the output voltage. As also discussed above with reference to FIG. 2A, in various embodiments the output voltage may be measured by one or more voltage sensors, such as the voltage sensor 230 positioned at the output 210 of the inverter system 200.

Figure 6:
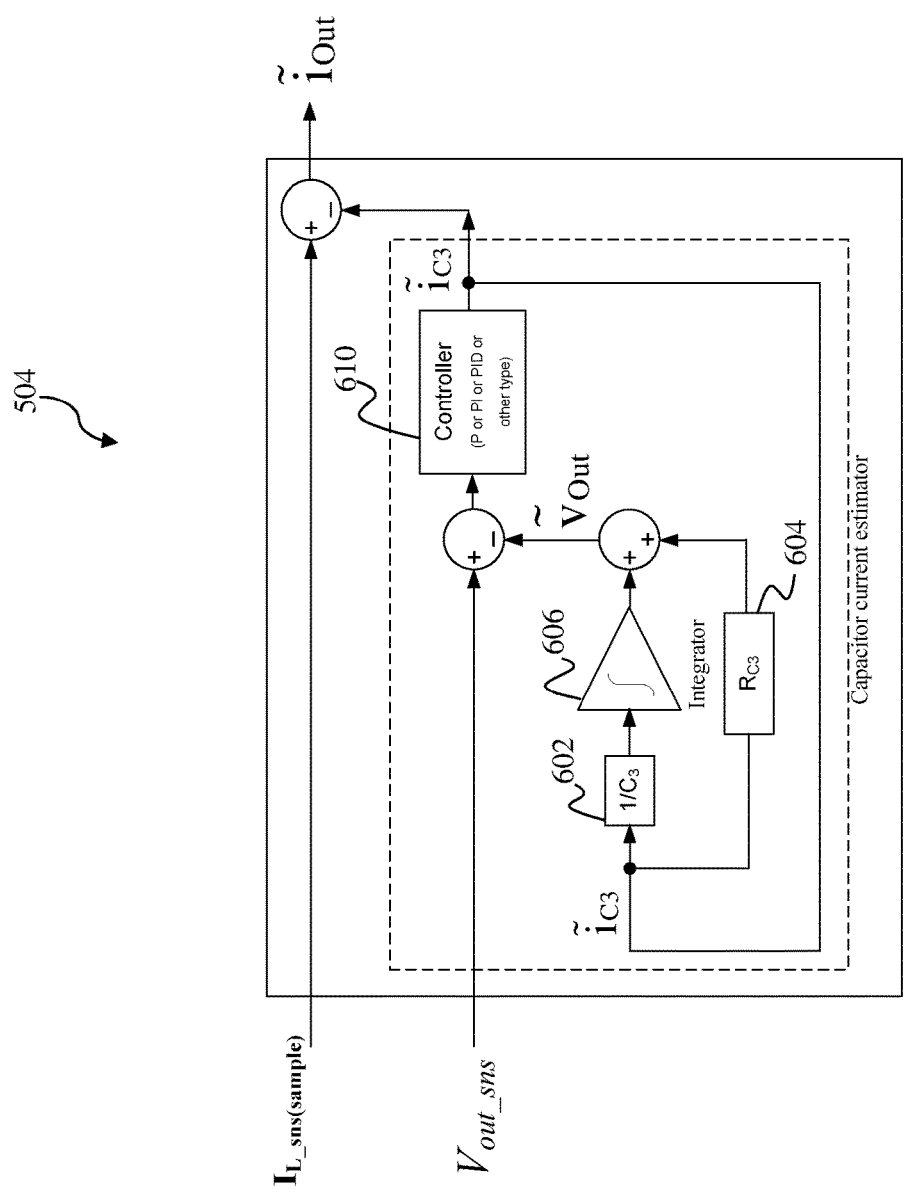
FIG. 6 is a schematic diagram of an example output current module according to aspects of the current invention.
Figure 7:
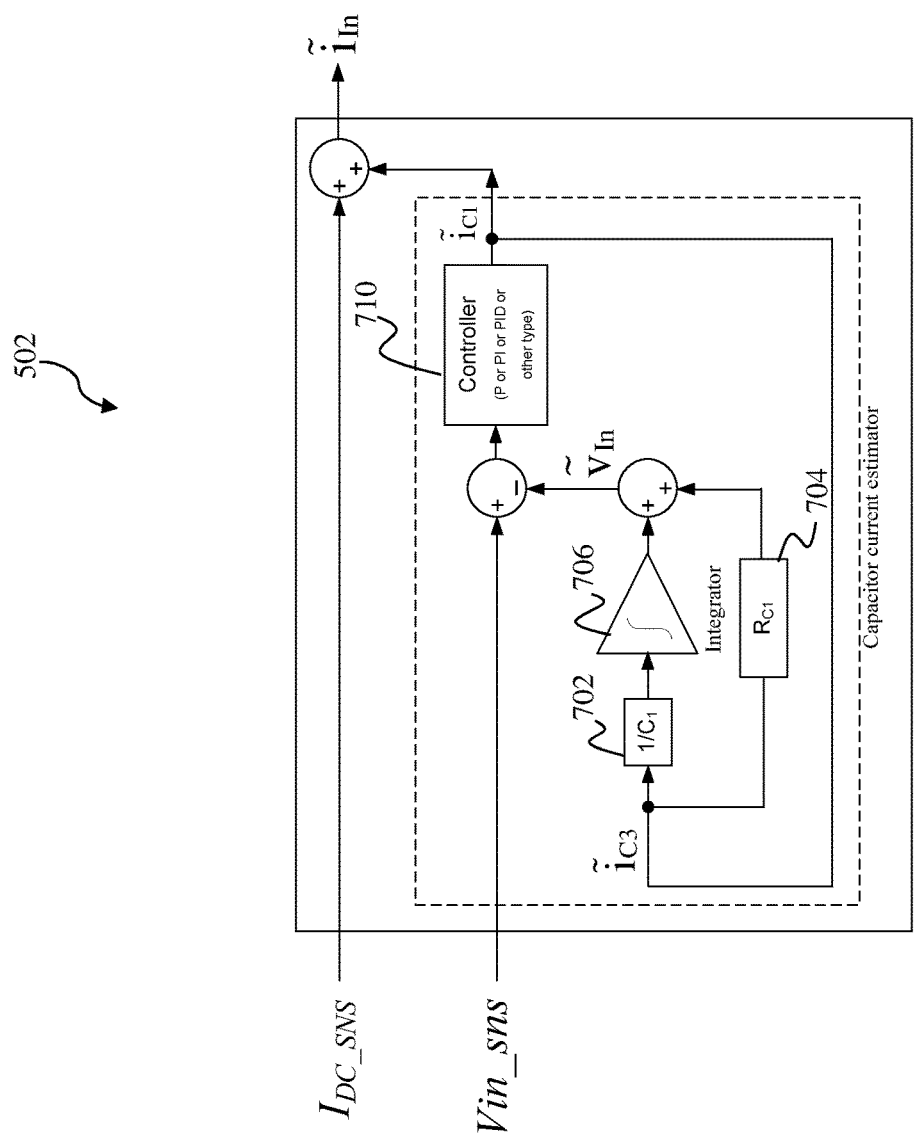
FIG. 7 is a schematic diagram of an example input current estimator according to aspects of the current invention.

FIG. 6 shows a detailed schematic diagram of an example output current module 504 according to various embodiments, and FIG. 7 shows a detailed schematic diagram of an example input current module 502 according to various embodiments.

Turning to FIG. 6, the output current estimator 504 is adapted to determine the output current $I_{out}$, as $i_{Out}$. As FIG. 6 shows, the output current estimator estimates a voltage across an output filter capacitor (e.g., output filter capacitor ($C_3$) 226 shown in FIG. 2A) based on a model of the output filter capacitor, and compares the estimated voltage to a measured output voltage of the inverter system. In various embodiments, the model of the capacitor includes a capacitance value of the capacitor (i.e., $C_3$) 602, an equivalent series resistance (ESR) (i.e., $R_{C3}$) 604, and an integrator 606. The voltage across the output filter capacitor is then compared with the measured output voltage to obtain an error between the two values (e.g., the difference between the voltage across the output filter capacitor and the measured output voltage). In particular, the voltage across the output capacitor may be subtracted from the measured output voltage.

The error is processed via control logic, which may be implemented by a controller 710 of the controller assembly (e.g., a proportional controller (P), a proportional integral controller (PI), or a proportional integral derivative controller (PID)), to determine the current at the output filter capacitor. The determined current at the output filter capacitor is fed back to the model of the output filter capacitor as feedback loop to correct the voltage across the output filter capacitor. In various embodiments, the output current estimator compares the current through the output filter capacitor and the sampled inductor current to determine a value for the output current. In particular, the output current estimator subtracts the determined current at the output filter capacitor from the sampled inductor current to calculate the value for output current, $i_{Out}$.

Turning to FIG. 7, the input current module 502 is adapted to determine the input current $I_{In}$, as $i_{in}$. As FIG. 7 shows, the input current module 502 determines a voltage across a bulk capacitor (e.g., bulk capacitor 220 shown in FIG. 2A) based on a model of the bulk capacitor, and compares the estimated voltage to a measured input voltage of the inverter system. In various embodiments, the model of the capacitor includes a value of the capacitor (i.e., $C_1$) 702, an equivalent series resistance (ESR) (i.e., $R_{C1}$) 704, and an integrator 706. The voltage across the bulk capacitor is then compared with the measured input voltage to obtain an error between the two values (e.g., the difference between the voltage across the bulk capacitor and the measured input voltage). In particular, the voltage across the bulk capacitor may be subtracted from the measured input voltage.

The error is processed via control logic, which may be implemented by a controller 610 of the controller assembly (e.g., a proportional controller (P), a proportional integral controller (PI), or a proportional integral derivative controller (PID)), to determine the current at the bulk capacitor. The determined current at the bulk capacitor is fed back to the model of the bulk capacitor as a feedback loop to correct the voltage across the bulk capacitor. In various embodiments, the input current module compares the current through the bulk capacitor and the DC node current to determine a value for the input current. In particular, the input current estimator adds the determined current at the bulk capacitor and the DC node current to calculate the value for output current, $i_{Out}$.

In one embodiment, the input current estimator and the output current estimator may use capacitor based models where the particular capacitance value has a +/−20% tolerances. Accordingly, various aspects and embodiments described herein resolve possible error in determining the output current based on the particular tolerances. In particular, the percentage error in output current determined by the inverter system may be relative to the ratio of a load current in RMS and a current at the output filter capacitor. A large ratio of load current to current at the output filter capacitor results in a negligible percentage error in the output current. In various embodiments, the current at the output filter capacitor is very small when compared to the load current. Accordingly, various embodiments significantly minimize the percentage error in the determined output current. In particular, various aspects and embodiments may experience a load current that is more than three times the current at the output filter capacitor, which reduces the error in estimating the output current to below 3%. As such, in addition to increasing the power density, decreasing the volumetric footprint, and increasing the simplicity of conventional inverter system, various aspects and embodiments accommodate for various inaccuracies in inverter system component models.

Figure 8:
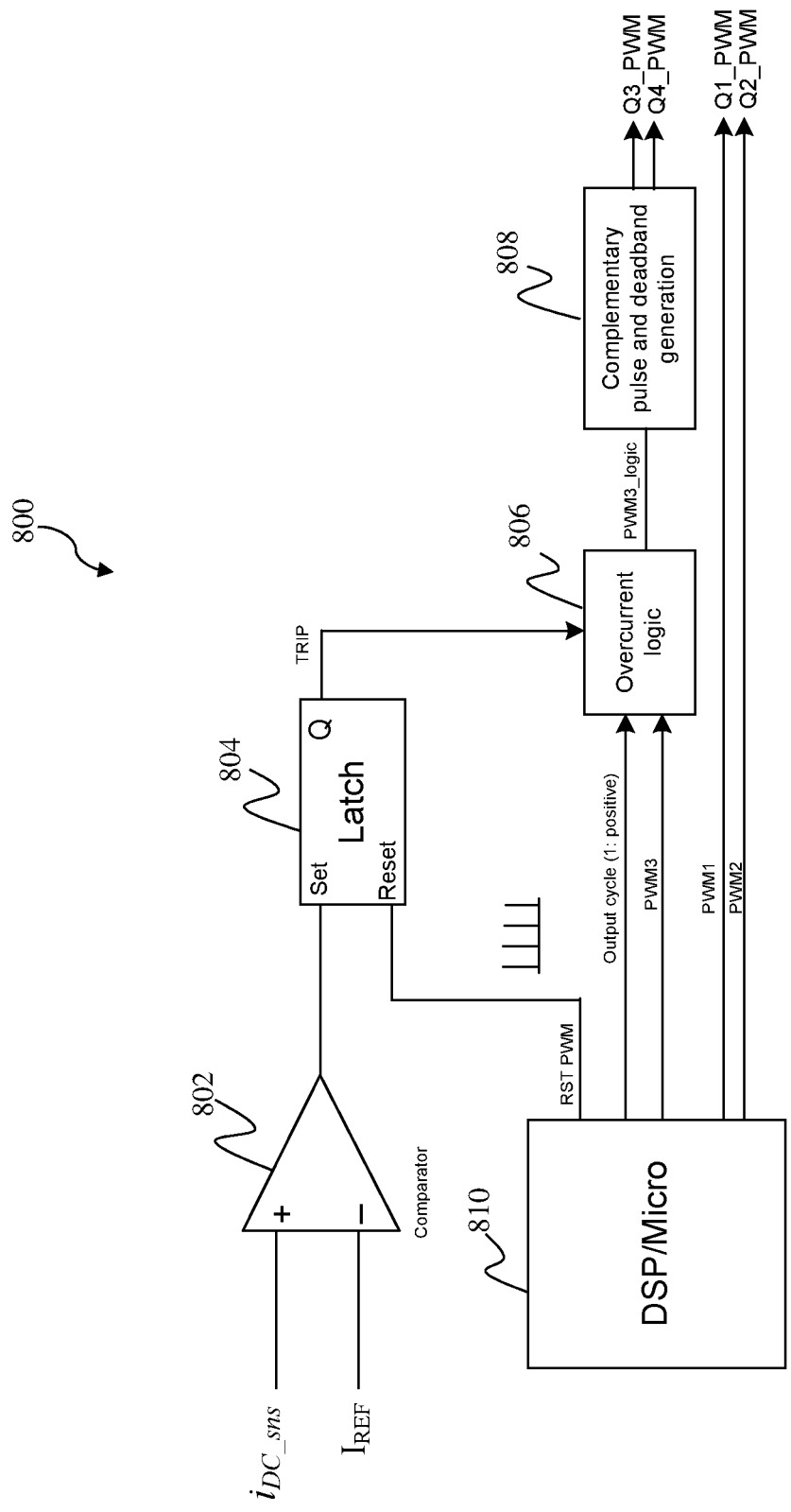
FIG. 8 is a block diagram of an example overcurrent protection system according to aspects of the current invention.

FIG. 8 is a block diagram of an example overcurrent protection system according to aspects of the current invention. FIG. 8 is discussed with reference to the inverter system 200 of FIG. 2A. As discussed above, in various embodiments a controller assembly (e.g., controller assembly 250 shown in FIG. 2B) includes the overcurrent protection system 800, while in various other embodiments, the overcurrent protection system 800 may be integral to a controller within the controller assembly 250. FIG. 8 shows the example overcurrent protection system 800 including a comparator 802, a latch 804, an overcurrent logic module 806, and a complementary pulse and deadband generation module 808. In various embodiments, components of the overcurrent protection system 800 are coupled with other components of the controller assembly 250, such as a microcontroller or DSP (i.e., block 810).

The overcurrent protection system 800 implements a pulse-by-pulse latched overcurrent protection scheme implemented in an analog domain outside the DSP of the controller assembly of one embodiment. The comparator 802 receives the DC node current, and compares a value of the DC node current with a reference current, $I_{REF}$. Accordingly, the comparator 802 of various embodiments may include an analog comparator, the output of which sets the latch 804 in the case of an overcurrent. The latch 802 is reset by the controller assembly, and in particular the DSP 810 of the controller assembly, at the beginning of every switching cycle of the switching signal triangle waveform. The output of the latch 804 (TRIP) is fed to the overcurrent logic module 806, which also receives from the DSP 810 a PWM control signal for the third switching device 236 (i.e., PWM3) and the output voltage cycle of the inverter system 200. Depending upon the current output voltage cycle (i.e., whether the output voltage cycle is positive or negative) the overcurrent logic block 806 determines the switching state for the switching devices of the second inverter leg 214 (i.e., the high-frequency inverter leg) and generates a corresponding switching device control signal (i.e., Q3_PWM and Q4_PWM). In various embodiments, this includes determining the current state (e.g., position) of the first and second switching devices 232, 234. Such an embodiment permits freewheeling of the inductor current either through the first switching device 232 and third switching device 236, or through the second switching device 234 and fourth switching device 238.

Figure 9:
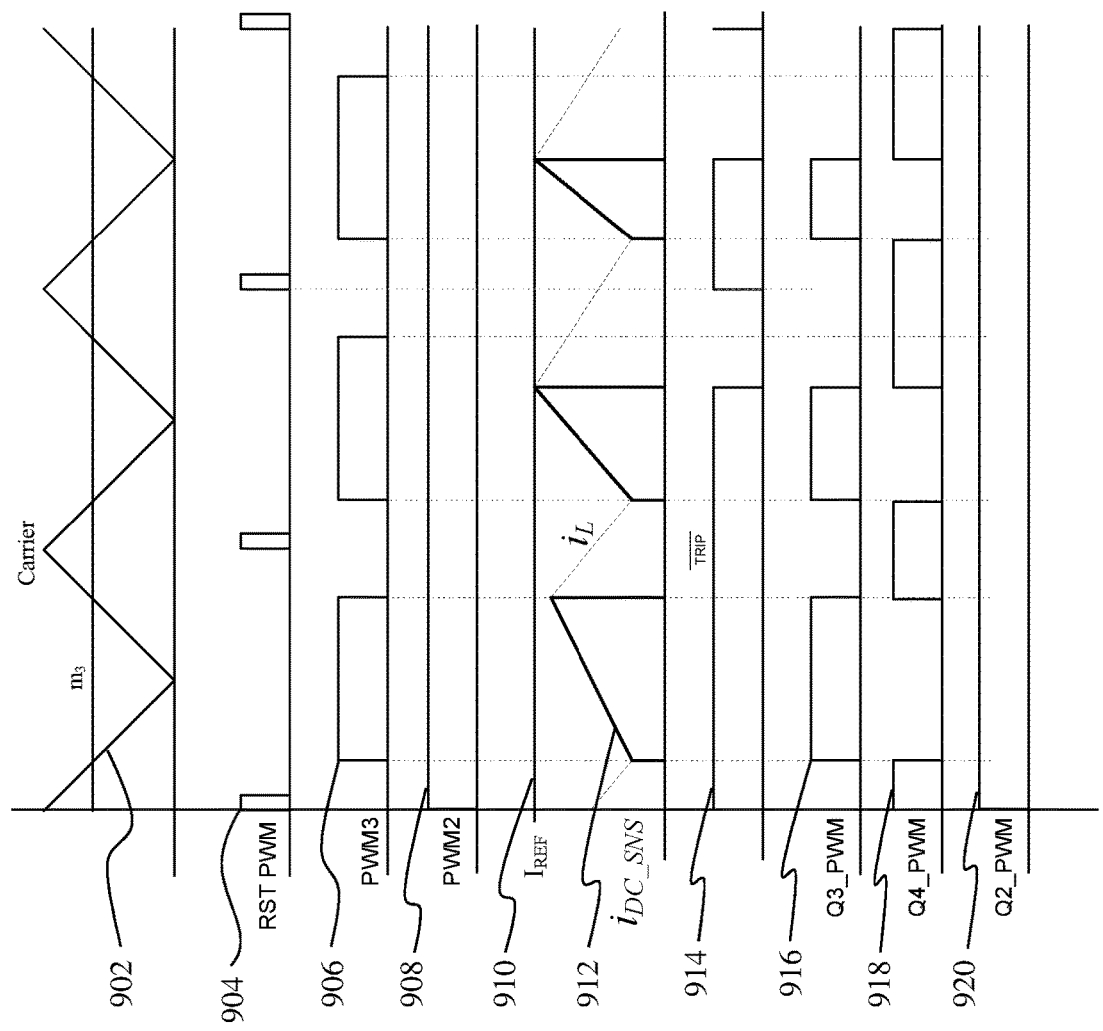
FIG. 9 is an illustration of example waveforms corresponding to the overcurrent protection system shown in FIG. 8, according to aspects of the current invention.

The output of the overcurrent logic module 806 is passed through the complementary pulse and deadband generation logic 808 before driving the third switching device 236 and the fourth switching device 238. FIG. 9 is an illustration of example waveforms corresponding to the overcurrent protection system 800 shown in FIG. 8.

A first waveform 902 represents the switching signal having a triangle waveform of one embodiment, a second waveform 904 represents the reset signal of one embodiment, the third waveform 906 represents the switching device control signal for controlling the third switching device 236 using the first waveform 902 prior to processing performed by the overcurrent logic module 806 and complementary pulse and deadband generation module 808 (i.e., PWM3), a fourth waveform 908 represents a first switching device control signal (PWM2) for controlling the second switching device 234 using the first waveform 902, a fifth waveform 910 represents the reference current, a sixth waveform 912 represents the DC node current, a seventh waveform 914 represents the output of the latch 804, an eighth waveform 916 represents the switching device control signal (Q3_PWM) for controlling the third switching device 236 using on the first waveform 902 after processing performed by the overcurrent logic module 808 and complementary pulse and deadband generation module 810, a ninth waveform 918 represents the a second switching device control signal (Q4_PWM) for controlling the of the fourth switching device 238 using the first waveform 902 after processing performed by the overcurrent logic module 808 and complementary pulse and deadband generation module 810, and the tenth waveform 920 represents the switching device control signal (Q2_PWM) for controlling the second switching device 234 during control of the third switching device 236 and fourth switching device 238 according to the eighth waveform 916 and ninth waveform 918. As shown the first switching device control signal and the second switching device control signal for controlling the second switching device 234 are substantially the same.

As discussed above, FIG. 9 shows waveforms corresponding to an overcurrent in the positive output voltage cycle. In various embodiments, the reference current and the DC node current are compared by the overcurrent protection system 800, and the latch 804 is set as shown. The latch 802 is reset by the controller assembly at the beginning of every switching cycle, as FIG. 9 also shows. The eighth waveform 916 and ninth waveform 918 show control of the third and fourth switching devices 236, 238 during an overcurrent in the positive output voltage cycle. For instance, the controller may activate the third switching device 236 at gradually decreasing time intervals while gradually increasing activation of the fourth switching device 238 at proportionate and gradually increasing time intervals. The tenth waveform 920 shows the second switching device 234 maintained in a constant activation state during the overcurrent. Similar processes may be performed during an overcurrent in a negative output voltage cycle of the inverter system 200. Accordingly, various embodiments provide an inverter system adapted to resolve overcurrent or excess current situations which may cause heat, fires, or other damaging events that could harm components of the inverter system and coupled devices.

Figure 10:
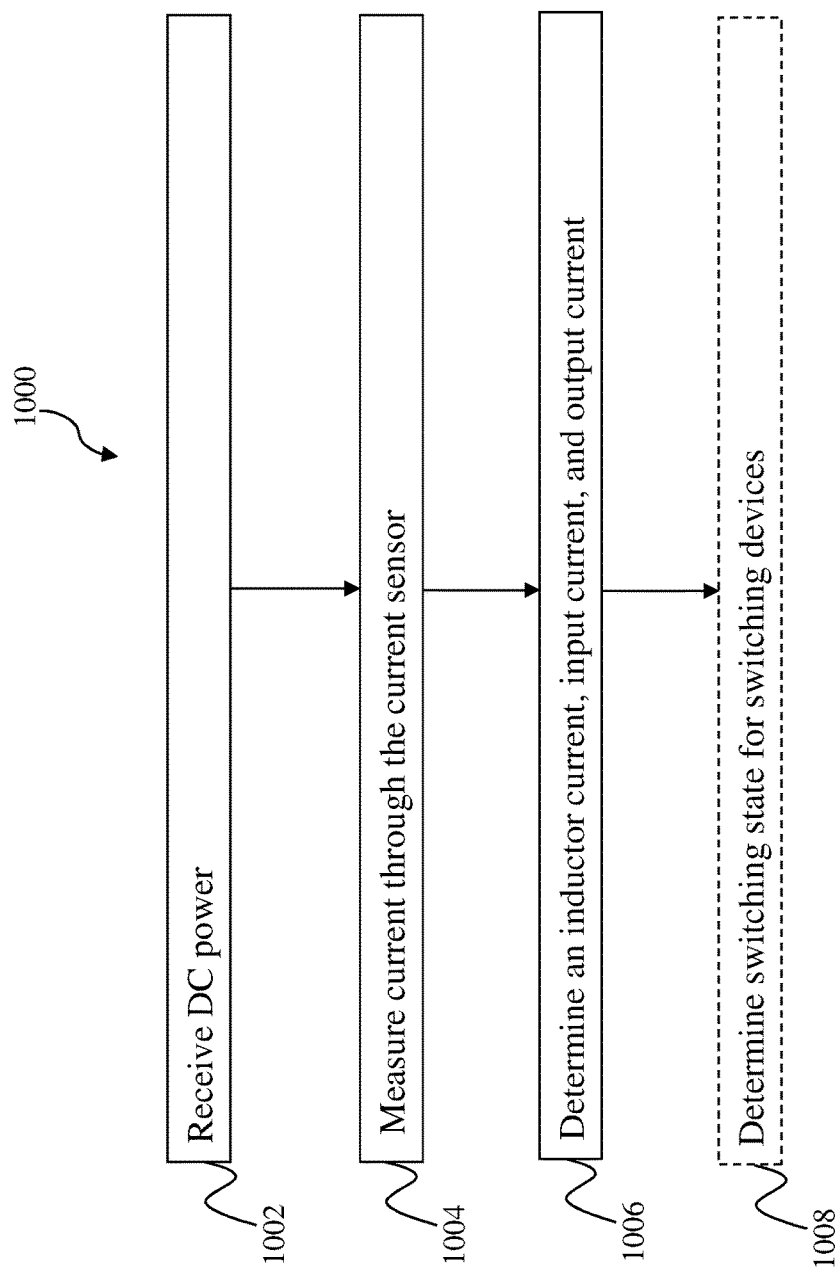
FIG. 10 is a process flow diagram according to various aspects of the current invention.

As described above with reference to at least FIG. 2A, several embodiments perform processes that determine an inductor current, an input current, and an output current in a full-bridge pulse width modulated inverter system. In some embodiments, these processes are executed by an inverter system including a current sensor, such as the inverter system 200 described above with reference to FIG. 2A. One example of such a process is illustrated in FIG. 10.

Process 1000 is discussed with continuing reference to the inverter system 200 shown in FIG. 2A. According to this example, the process 1000 may include acts of receiving DC power, measuring a current through the current sensor, and determining an inductor current, an input current, and an output current based at least in part on the current through the current sensor. In further embodiments, the method 1000 may further include one or more processes for controlling overcurrent systems, such as processes for determining a switching state for switching devices of one or more inverter legs within the inverter system during an overcurrent.

As discussed above, various embodiments of the inverter system described herein may include an input having a positive DC node and a negative DC node coupled to a DC power source. Accordingly, act 1002 may include receiving DC power from the DC power source at the input of the inverter system. Similarly, the inverter system may also include an output coupled to at least one load, and, accordingly, the process 1000 may also include providing AC output power to the at least one load.

Act 1004 may include measuring a current through the current sensor coupled in one of the negative DC node and positive DC node of the input. In at least one embodiment, the current sensor includes a non-inductive current sense resistor, and measuring the current through the current sensor includes measuring a voltage drop across the non-inductive current sense resistor. The process 1000 may include filtering noise from the detected signal and amplifying the detected signal to measure the current through the current sensor. As described above, the current through the current sensor corresponds to the current at the DC node, and is also referred to as the DC node current. In further embodiments, the process 1000 may also include measuring an input voltage at the input of the inverter system via one or more voltage sensors, and measuring an output voltage at the output of the inverter system via an additional one or more voltage sensors. The process 1000 may then include determining an inductor current through an inductor coupled to the output, the input current, and the output current based at least in part on the current through the current sensor.

In one embodiment, the act of determining the inductor current (act 1106) may further include sampling the current through the current sensor at a valley of a switching signal during a positive cycle of an output voltage. Similarly, the act of determining the inductor current may include sampling the current through the current sensor at a peak of the switching signal during a negative cycle of the output voltage. This may include sampling the current through the current sensor at an analog-to-digital converter of the controller assembly of the inverter system. In such an embodiment, the first inverter leg and second inverter leg are controlled via switching device control signals using on a switching signal having a triangular waveform.

As discussed above with reference to at least FIG. 3, sampling the current through the current sensor at the valley of the switching signal, samples the averaged inductor current. Likewise, sampling the current through the current sensor at the peaks of the switching signal, samples the average negative inductor current. Accordingly, in at least one embodiment the process 1000 includes sampling the DC node current at a valley of the switching signal during a positive cycle of the output voltage, and at a peak of the switching single during a negative cycle of the output voltage to determine a sampled inductor current (i.e., a digital signal).

As discussed with reference to FIG. 2A, the inverter system of at least one embodiment may include a bulk capacitor coupled between the positive DC node and the negative DC node, and an output filter capacitor coupled across the output. In such an embodiment, the process 1000, and in particular the act of determining the input current (act 1006), may include determining a voltage across the bulk capacitor based at least in part on a model of the bulk capacitor. The model of the bulk capacitor may include a capacitance value of the bulk capacitor and an ESR of the capacitor.

Once the output voltage is determined, the process 1000 may include comparing the voltage across the bulk capacitor and the input voltage to determine a current through the bulk capacitor. In particular, voltage across the bulk capacitor may be compared with the measured input voltage to obtain an error between the two values (e.g., the difference between the voltage across the bulk capacitor and the measured input voltage). For instance, the voltage across the bulk capacitor may be subtracted from the measured input voltage. Based on the error, the process 1000 may include determining the current across the bulk capacitor and comparing the current across the bulk capacitor and the DC node current to determine a value for the input current. In particular, the process 1000 may include adding the determined current at the bulk capacitor and the DC node current to calculate the value for the output current.

In various embodiments, the process 1000, and in particular the act of determining the output current (act 1006) may include determining a voltage across the output filter capacitor based at least in part on a model of the output filter capacitor. The model of the output filter capacitor may include a capacitance value of the output filter capacitor and an ESR of the capacitor. Once determined, the process 1000 may include comparing the estimated voltage across the output filter capacitor and the input voltage to determine a current through the output filter capacitor. In particular, the voltage across the output filter capacitor may be compared with the measured output voltage to obtain an error between the two values (e.g., the difference between the voltage across the output filter capacitor and the measured input voltage). For instance, the voltage across the output filter capacitor may be subtracted from the measured output voltage. Based on the error, the process 1000 may include determining the current across the output filter capacitor, and comparing the current across the output filter capacitor and the inductor current to determine a value for the output current. In particular, the process 1000 may include removing the determined current at the output filter capacitor from the current through the current sensor to calculate the value for the output current.

As discussed herein, various aspects and embodiments provide systems and processes for overcurrent protection in an inverter system. For instance, in one embodiment the inverter system may include an overcurrent protection system including a comparator, a latch, an overcurrent logic module, and a complementary pulse and deadband generation module. In various embodiments, the process 1000 may include one or more acts for controlling the inverter system during an overcurrent situation (act 1008). In particular, the process 1000 may include a pulse-by-pulse latched overcurrent protection process implemented in an analog domain outside the DSP of the controller assembly of one embodiment.

The process 1000 may include the acts of receiving the DC node current, and comparing a value of the DC node current with a reference current. The process 1000 may include the act of setting a latch in the case of an overcurrent. The latch is reset by the controller assembly, and in particular the DSP of the controller assembly, at the beginning of every switching cycle of the switching signal waveform. The output of the latch is fed to the overcurrent logic module, which also receives from the DSP a PWM control signal for the third switching device (i.e., PWM3) and the output voltage cycle of the inverter system. Depending upon the current output voltage cycle (i.e., whether the output voltage cycle is positive or negative) the process 1000 includes determining a switching state for the switching devices of the second inverter leg (i.e., the high-frequency inverter leg) and generating a corresponding switching device control signal (i.e., Q3_PWM and Q4_PWM). In various embodiments, this includes determining the current state (e.g., position) of the first and second switching devices. Such an embodiment permits freewheeling of the inductor current either through the first switching device and third switching device, or through the second switching device and fourth switching device. The output of the overcurrent logic module is passed through the complementary pulse and deadband generation logic before driving the third switching device and the fourth switching device.

As discussed above, various aspects and embodiments provide an improved current sensing system and inverter that effectively increase the power density of conventional systems, while reducing cost, and eliminating the need for multiple isolated current sensors. Accordingly, various aspects and embodiments also simplify the hardware circuit complexity and printed circuit board (PCB) layout of conventional systems.

Various aspects and functions described herein in accord with the present disclosure may be implemented as hardware, software, firmware or any combination thereof. Aspects in accord with the present disclosure may be implemented within methods, acts, systems, system elements and components using a variety of hardware, software or firmware configurations. Furthermore, aspects in accord with the present disclosure may be implemented as specially programmed hardware and/or software.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An inverter system comprising:
   an input having an input current, a positive DC node, and a negative DC node adapted to be coupled to a DC power source and to receive input DC power from the DC power source;
   an output, having an output current, adapted to be coupled to at least one load and to provide output AC power to the at least one load;
   a first inverter leg including a first switching device and a second switching device;
   a second inverter leg including a third switching device and a fourth switching device, the first inverter leg and the second inverter leg being coupled between the input and the output and adapted to convert the input DC power to the output AC power;
   a single current sensor coupled to one of the negative DC node and the positive DC node;
   a controller assembly adapted to measure a current through the single current sensor and determine an inductor current through an inductor coupled between the second inverter leg and the output based at least in part on the current through the single current sensor, determine the input current based at least in part on the current through the single current sensor, and determine the output current based at least in part on the current through the single current sensor; and
   an output capacitor coupled across the output;
   wherein the controller assembly is further adapted to:
   estimate a voltage across the output capacitor based at least in part on a model of the output capacitor;
   compare the estimated voltage across the output capacitor and an output voltage to determine a current through the output capacitor; and
   compare the current through the output capacitor and the inductor current to determine the output current.

2. The inverter system of claim 1, wherein the single current sensor is a non-inductive current sense resistor.

3. The inverter system of claim 2, further comprising a first capacitor coupled between the negative DC node and the positive DC node, and a second capacitor coupled between the negative DC node and the positive DC node, and wherein the non-inductive current sense resistor is coupled between the first capacitor and the second capacitor.

4. The inverter system of claim 3, further comprising a first voltage sensor positioned to measure an input voltage, and a second voltage sensor positioned to measure the output voltage, wherein the controller assembly is adapted to determine a value for the input current based on the current through the single current sensor and the input voltage, and adapted to control the first inverter leg and the second inverter leg based on the value for the input current and the output current.

5. The inverter system of claim 4, wherein the controller assembly is adapted to:
estimate a voltage across the first capacitor based at least in part on a model of the first capacitor;
compare the estimated voltage across the first capacitor and the input voltage to determine a current through the first capacitor; and
compare the current through the first capacitor and the current through the single current sensor to determine the input current.

6. The inverter system of claim 2, wherein the controller assembly is adapted to control the first inverter leg and the second inverter leg based on a switching signal having a triangular waveform, and sample the current through the single current sensor at a valley of the switching signal during a positive cycle of an output voltage to determine the inductor current.

7. The inverter system of claim 6, wherein the controller assembly is adapted to sample the current through the single current sensor at a peak of the switching signal during a negative cycle of the output voltage to determine the inductor current.

8. The inverter system of claim 1, further comprising an overcurrent protection system adapted to determine the occurrence of an overcurrent condition and control a position of the third switching device and fourth switching device of the second inverter leg during the overcurrent condition.

9. A method for operating an inverter system including an input having an input current, a positive DC node, and a negative DC node, an output, having an output current, coupled to at least one load, a first inverter leg and a second inverter leg coupled between the input and the output, an inductor coupled between the second inverter leg and the output, and a single current sensor coupled to one of the negative DC node and the positive DC node, the method comprising:
receiving DC power from a DC power source at the input;
measuring a current through the single current sensor coupled to one of the negative DC node and positive DC node; and
determining an inductor current at the inductor based at least in part on the current through the single current sensor, the input current based at least in part on the current through the single current sensor, and the output current based at least in part on the current through the single current sensor;
wherein the inverter system includes an output capacitor coupled across the output, and wherein determining the output current further includes:
measuring an output voltage;
determining a voltage across the output capacitor based at least in part on a model of the output capacitor;
comparing the estimated voltage across the output capacitor and the output voltage to determine a current through the output capacitor; and
comparing the current through the output capacitor and the inductor current to determine a value for the output current.

10. The method of claim 9, wherein the single current sensor is a non-inductive current sense resistor, and wherein measuring the current through the single current sensor includes measuring a voltage drop across the non-inductive current sense resistor.

11. The method of claim 10, wherein determining the inductor current includes sampling the current through the single current sensor at a valley of a switching signal during a positive cycle of an output voltage, wherein the first inverter leg and second inverter leg are controlled based on a switching signal having a triangular waveform.

12. The method of claim 11, wherein determining the inductor current includes sampling the current through the single current sensor at a peak of the switching signal during a negative cycle of the output voltage.

13. The method of claim 12, wherein the inverter system includes a first capacitor coupled between the negative DC node and the positive DC node, and wherein determining the input current includes:
measuring an input voltage;
determining a voltage across the first capacitor based at least in part on a model of the first capacitor;
comparing the estimated voltage across the first capacitor and the input voltage to determine a current through the first capacitor; and
comparing the current through the first capacitor and the DC node current to determine a value for the input current.

14. The method of claim 9, further comprising:
comparing the current through the single current sensor to a reference current to detect the occurrence of an overcurrent condition; and
controlling a position of a first switching device of the second inverter leg and a second switching device of the second inverter leg during the overcurrent condition.

* * * * *